United States Patent
Yoo et al.

(10) Patent No.: US 10,641,360 B2
(45) Date of Patent: May 5, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Ilhan Yoo, Hwasun-eup (KR); Seongwook Ji, Gunpo-si (KR); Juhyeon Park, Suwon-si (KR); Hyun Sik Kwon, Seoul (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/178,767

(22) Filed: Nov. 2, 2018

(65) Prior Publication Data
US 2019/0390739 A1 Dec. 26, 2019

(30) Foreign Application Priority Data
Jun. 25, 2018 (KR) .......................... 10-2018-0072635

(51) Int. Cl.
*F16H 3/62* (2006.01)

(52) U.S. Cl.
CPC ....... *F16H 3/62* (2013.01); *F16H 2200/0069* (2013.01); *F16H 2200/2012* (2013.01); *F16H 2200/2046* (2013.01)

(58) Field of Classification Search
CPC ............... F16H 3/62; F16H 2200/0069; F16H 2200/2012; F16H 2200/2046
See application file for complete search history.

(56) References Cited

U.S. PATENT DOCUMENTS

| | | | | |
|---|---|---|---|---|
| 2012/0270694 A1* | 10/2012 | Seo | ........................... | F16H 3/66 475/276 |
| 2013/0237365 A1* | 9/2013 | Coffey | ...................... | F16H 3/66 475/276 |
| 2014/0128199 A1* | 5/2014 | Coffey | .................... | F16H 3/666 475/276 |
| 2015/0094185 A1* | 4/2015 | Beck | ........................ | F16H 3/66 475/275 |

* cited by examiner

*Primary Examiner* — Huan Le
(74) *Attorney, Agent, or Firm* — Morgan, Lewis & Bockius LLP (57) ABSTRACT

A planetary gear train may include: an input shaft; an output shaft; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; four clutches, each selectively connecting at least one of the first to twelfth rotation elements to another rotation element or the input shaft; and two brakes, each selectively connectable at least one of the first to twelfth rotation elements to a transmission housing.

20 Claims, 3 Drawing Sheets

| Speed stages | Engaging elements |  |  |  |  |  | Gear ratio |
|---|---|---|---|---|---|---|---|
|  | C1 | C2 | C3 | C4 | B1 | B2 |  |
| D1 |  | ● |  | ● | ● |  | 5.177 |
| D2 |  | ● |  |  | ● | ● | 3.864 |
| D3 |  | ● |  | ● |  | ● | 2.745 |
| D4 |  | ● | ● |  |  | ● | 1.670 |
| D5 | ● | ● |  |  |  | ● | 1.323 |
| D6 | ● |  | ● |  |  | ● | 1.227 |
| D7 | ● |  | ● | ● |  |  | 1.000 |
| D8 | ● |  |  | ● |  | ● | 0.932 |
| D9 | ● |  |  | ● | ● |  | 0.836 |
| D10 | ● |  |  |  | ● | ● | 0.624 |
| REV |  | ● | ● |  | ● |  | -3.714 |

FIG. 3

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2018-0072635 filed on Jun. 25, 2018, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving ten forward speeds with a minimum number of constituent elements being used and improves silent driving of the vehicle by use of operation point positioned at a low engine speed.

Description of Related Art

Generally, an automatic transmission achieving more speed stages has been developed for enhancing fuel economy and optimizing drivability. Recently, increase of oil price is triggering a hard competition in enhancing fuel consumption of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increases, the number of internal components (particularly, planetary gear sets) increases, and as a result, a length of the transmission increases. Therefore, mountability, cost, weight, transmission efficiency, and the like may still deteriorate.

Accordingly, development of a planetary gear train which may achieve maximum efficiency with a small number of components may be important to increase a fuel economy enhancement effect through the multiple-speeds.

In the present aspect, in recent years, 8-speed automatic transmissions tend to be implemented and the research and development of a planetary gear train capable of implementing more speed stages has also been actively conducted.

However, a conventional 8-speed automatic transmission typically may include three to four planetary gear sets and five to seven engagement elements (friction elements). In the instant case, since the length of the automatic transmission increases, mountability may be deteriorated.

Recently, one planetary gear set is disposed above another planetary gear set, but structures of automatic transmissions to which parallel planetary gear sets is applied are very limited.

In another way, dog clutches instead of engagement elements of wet-type are used. However, shift feel may be deteriorated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving ten forward speeds and one reverse speed with a minimum number of constituent elements being used.

Various aspects of the present invention are directed to providing a planetary gear train of an automatic transmission for a vehicle having further advantages of improving silent driving of the vehicle by use of operation point positioned at a low rotation speed region of an engine.

A planetary gear train of an automatic transmission for a vehicle according to an exemplary embodiment of the present invention may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft fixedly connected to the third rotation element and selectively connectable to the input shaft; a second shaft fixedly connected to the fourth rotation element and selectively connectable to the input shaft; a third shaft fixedly connected to the twelfth rotation element and the output shaft; a fourth shaft fixedly connected to the first rotation element, the sixth rotation element, and the eighth rotation element; a fifth shaft fixedly connected to the ninth rotation element and the tenth rotation element; a sixth shaft fixedly connected to the second rotation element, the fifth rotation element, and the eleventh rotation element; and a seventh shaft fixedly connected to the seventh rotation element.

The planetary gear train may further include six engaging elements, each selectively connecting any one shaft with another shaft or any one shaft with a transmission housing, wherein forward speeds or reverse speeds are achieved by operating any three engaging elements among the six engaging elements.

The six engaging elements may include: four clutches, each selectively connecting two shafts among the input shaft and the seven shafts; and two brakes, each selectively connecting any one shaft among the seven shafts which is not connected to the output shaft with a transmission housing.

The six engaging elements may include: a first clutch disposed between the input shaft and the first shaft; a second clutch disposed between the input shaft and the second shaft; a third clutch disposed between the third shaft and the fourth shaft; a fourth clutch disposed between the fourth shaft and the seventh shaft; a first brake disposed between the sixth shaft and a transmission housing; and a second brake disposed between the seventh shaft and the transmission housing.

In one aspect, each of the first, second, third, and fourth planetary gear sets may be a single pinion planetary gear set, wherein the first rotation element is a first sun gear, the second rotation element is a first planet carrier, the third rotation element is a first ring gear, the fourth rotation element is a second sun gear, the fifth rotation element is a second planet carrier, the sixth rotation element is a second ring gear, the seventh rotation element is a third sun gear, the eighth rotation element is a third planet carrier, the ninth rotation element is a third ring gear, the tenth rotation element is a fourth sun gear, the eleventh rotation element is a fourth planet carrier, and the twelfth rotation element is a fourth ring gear.

In another aspect, each of the first, second, and third planetary gear sets may be a single pinion planetary gear set, wherein the first rotation element is a first sun gear, the second rotation element is a first planet carrier, the third rotation element is a first ring gear, the fourth rotation element is a second sun gear, the fifth rotation element is a second planet carrier, the sixth rotation element is a second ring gear, the seventh rotation element is a third sun gear, the eighth rotation element is a third planet carrier, and the ninth rotation element is a third ring gear. The fourth planetary gear set may be a double pinion planetary gear set, wherein the tenth rotation element is a fourth sun gear, the eleventh rotation element is a ring gear, and the twelfth rotation element is a fourth planet carrier.

The first, second, third, and fourth planetary gear sets may be disposed in a sequence of the first, second, third, and fourth planetary gear sets from an engine side thereof.

A planetary gear train of an automatic transmission for a vehicle according to various exemplary embodiments of the present invention may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft fixedly connected to the third rotation element and selectively connectable to the input shaft; a second shaft fixedly connected to the fourth rotation element and selectively connectable to the input shaft; a third shaft fixedly connected to the twelfth rotation element and the output shaft; a fourth shaft fixedly connected to the first rotation element, the sixth rotation element, and the eighth rotation element; a fifth shaft fixedly connected to the ninth rotation element and the tenth rotation element; and a plurality of shafts formed by combinations of remaining rotation elements among the rotation element of the first, second, third, and fourth planetary gear sets that are not connected to the first shaft to the fifth shaft, and each thereof selectively connectable to a transmission housing.

The plurality of shafts may include: a sixth shaft fixedly connected to the second rotation element, the fifth rotation element, and the eleventh rotation element; and a seventh shaft fixedly connected to the seventh rotation element.

The third shaft may be selectively connectable to the fourth shaft and the fourth shaft may be selectively connectable to the seventh shaft.

The planetary gear train may further include: a first clutch disposed between the input shaft and the first shaft; a second clutch disposed between the input shaft and the second shaft; a third clutch disposed between the third shaft and the fourth shaft; and a fourth clutch disposed between the fourth shaft and the seventh shaft.

The planetary gear train may further include two brakes, each selectively connecting any one of the sixth shaft and the seventh shaft to the transmission housing.

The two brakes may include: a first brake disposed between the sixth shaft and a transmission housing; and a second brake disposed between the seventh shaft and the transmission housing.

In one aspect, each of the first, second, third, and fourth planetary gear sets may be a single pinion planetary gear set, wherein the first rotation element is a first sun gear, the second rotation element is a first planet carrier, the third rotation element is a first ring gear, the fourth rotation element is a second sun gear, the fifth rotation element is a second planet carrier, the sixth rotation element is a second ring gear, the seventh rotation element is a third sun gear, the eighth rotation element is a third planet carrier, the ninth rotation element is a third ring gear, the tenth rotation element is a fourth sun gear, the eleventh rotation element is a fourth planet carrier, and the twelfth rotation element is a fourth ring gear.

In another aspect, each of the first, second, and third planetary gear sets may be a single pinion planetary gear set, wherein the first rotation element is a first sun gear, the second rotation element is a first planet carrier, the third rotation element is a first ring gear, the fourth rotation element is a second sun gear, the fifth rotation element is a second planet carrier, the sixth rotation element is a second ring gear, the seventh rotation element is a third sun gear, the eighth rotation element is a third planet carrier, and the ninth rotation element is a third ring gear. The fourth planetary gear set may be a double pinion planetary gear set, wherein the tenth rotation element is a fourth sun gear, the eleventh rotation element is a ring gear, and the twelfth rotation element is a fourth planet carrier.

A planetary gear train of an automatic transmission for a vehicle according to other exemplary embodiment of the present invention may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements, wherein each of the third rotation element and the fourth rotation element is selectively connectable to the input shaft, the twelfth rotation element is fixedly connected to the output shaft, the first rotation element is fixedly connected to the sixth rotation element and the eighth rotation element, the second rotation element is fixedly connected to the fifth rotation element and the eleventh rotation element and is selectively connectable to a transmission housing, the seventh rotation element is selectively connectable to the transmission housing, the eighth rotation element is selectively connectable to the seventh rotation element and the twelfth rotation element, and the ninth rotation element is fixedly connected to the tenth rotation element.

The planetary gear train may further include: four clutches, each selectively connecting any one rotation element to the input shaft or selectively connecting any two rotation elements; and two brakes, each selectively connecting any one of the second rotation element and the seventh rotation element to the transmission housing.

The four clutches may include: a first clutch disposed between the third rotation element and the input shaft; a second clutch disposed between the fourth rotation element and the input shaft; a third clutch disposed between the eighth rotation element and the twelfth rotation element; and a fourth clutch disposed between the seventh rotation element and the eighth rotation element.

The two brakes may include: a first brake disposed between the second rotation element and the transmission housing; and a second brake disposed between the seventh rotation element and the transmission housing.

In one aspect, each of the first, second, third, and fourth planetary gear sets may be a single pinion planetary gear set, wherein the first rotation element is a first sun gear, the second rotation element is a first planet carrier, the third rotation element is a first ring gear, the fourth rotation element is a second sun gear, the fifth rotation element is a second planet carrier, the sixth rotation element is a second ring gear, the seventh rotation element is a third sun gear, the eighth rotation element is a third planet carrier, the ninth rotation element is a third ring gear, the tenth rotation element is a fourth sun gear, the eleventh rotation element is a fourth planet carrier, and the twelfth rotation element is a fourth ring gear.

In another aspect, each of the first, second, and third planetary gear sets may be a single pinion planetary gear set, wherein the first rotation element is a first sun gear, the second rotation element is a first planet carrier, the third rotation element is a first ring gear, the fourth rotation element is a second sun gear, the fifth rotation element is a second planet carrier, the sixth rotation element is a second ring gear, the seventh rotation element is a third sun gear, the eighth rotation element is a third planet carrier, and the ninth rotation element is a third ring gear. The fourth planetary gear set may be a double pinion planetary gear set, wherein the tenth rotation element is a fourth sun gear, the eleventh rotation element is a ring gear, and the twelfth rotation element is a fourth planet carrier.

The planetary gear train according to the exemplary embodiments of the present invention may achieve ten forward speeds and one reverse speed by combining four planetary gear sets being simple planetary gear sets with six engagement elements.

Furthermore, the planetary gear train according to the exemplary embodiments of the present invention may achieve speed stages suitable to a rotation speed of the engine due to multiple-speed stages of the automatic transmission. Silent driving of the vehicle may be improved by use of operation point positioned at a low rotation speed region of the engine.

Furthermore, the planetary gear train according to the exemplary embodiments of the present invention may maximize driving efficiency of the engine due to multiple-speed stages and improve power delivery performance and fuel economy.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

Figure 1:
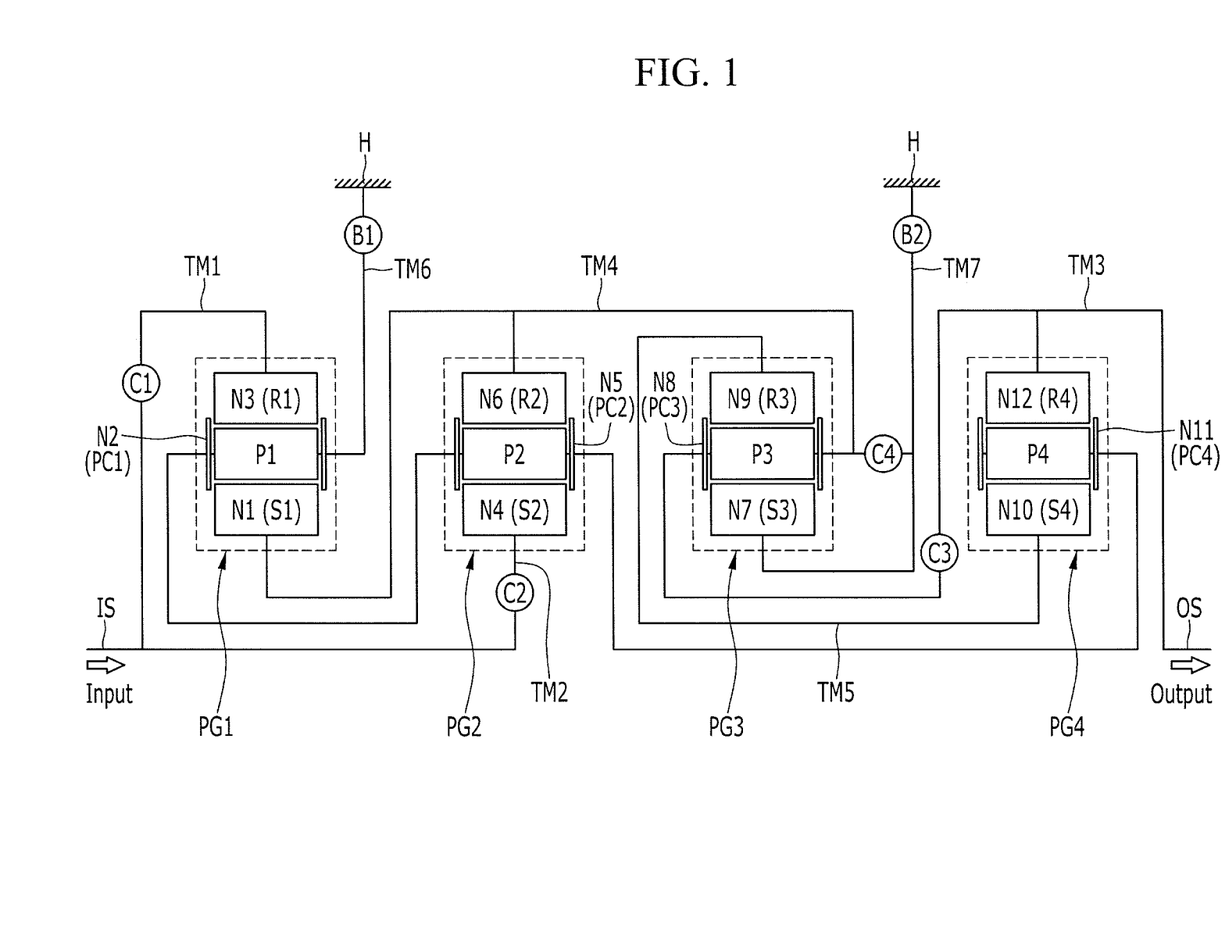
FIG. 1 is a schematic diagram of a planetary gear train according to the various exemplary embodiments of the present invention.

FIG. 1 is a schematic diagram of a planetary gear train according to the various exemplary embodiments of the present invention.

Referring to FIG. 1, a planetary gear train according to the various exemplary embodiments of the present invention includes first, second, third, and fourth planetary gear sets PG1, PG2, PG3, and PG4 disposed on the same axis, an input shaft IS, an output shaft OS, seven shafts TM1 to TM7 connected to at least one rotation element of the first, second, third, and fourth planetary gear sets PG1, PG2, PG3, and PG4, engagement elements including four clutches C1 to C4 and two brakes B1 and B2, and a transmission housing H.

Torque input from an engine to the input shaft IS is changed by cooperation of the first, second, third, and fourth planetary gear sets PG1, PG2, PG3, and PG4, and the changed torque is output through the output shaft OS.

According to the various exemplary embodiments of the present invention, the planetary gear sets are disposed in a sequence of the first, second, third, and fourth planetary gear sets PG1, PG2, PG3, and PG4 from an engine side on an axis of the input shaft IS.

The input shaft IS is an input member and a torque from a crankshaft of the engine is torque-converted through a torque converter to be input into the input shaft IS.

The output shaft OS is an output element, is disposed in parallel with the input shaft IS, and transmits driving torque to a driving wheel through a differential apparatus.

The first planetary gear set PG1 is a single pinion planetary gear set and includes a first sun gear S1 as a first rotation element N1, a first planet carrier PC1 as a second rotation element N2 that rotatably supports a plurality of first pinion gears P1 disposed evenly at an external circumference of the first sun gear S1 and engaged with the first sun gear S1, and a first ring gear R1 as a third rotation element N3 which is engaged with the first pinion gears P1 at a radial external of the plurality of first pinion gears P1 to be operably connected to the first sun gear S1.

The second planetary gear set PG2 is a single pinion planetary gear set and includes a second sun gear S2 as a fourth rotation element N4, a second planet carrier PC2 as a fifth rotation element N5 that rotatably supports a plurality of second pinion gears P2 disposed evenly at an external circumference of the second sun gear S2 and engaged with the second sun gear S2, and a second ring gear R2 as a sixth rotation element N6 which is engaged with the second pinion gears P2 at a radial external of the plurality of second pinion gears P2 to be operably connected to the second sun gear S2.

The third planetary gear set PG3 is a single pinion planetary gear set and includes a third sun gear S3 as a seventh rotation element N7, a third planet carrier PC3 as an eighth rotation element N8 that rotatably supports a plurality of third pinion gears P3 disposed evenly at an external circumference of the third sun gear S3 and engaged with the third sun gear S3, and a third ring gear R3 as a ninth rotation element N9 which is engaged with the third pinion gears P3 at a radial external of the plurality of third pinion gears P3 to be operably connected to the third sun gear S3.

The fourth planetary gear set PG4 is a single pinion planetary gear set and includes a fourth sun gear S4 as a tenth rotation element N10, a fourth planet carrier PC4 as an eleventh rotation element N11 that rotatably supports a plurality of fourth pinion gears P4 disposed evenly at an external circumference of the fourth sun gear S4 and engaged with the fourth sun gear S4, and a fourth ring gear R4 as a twelfth rotation element N12 which is engaged with the fourth pinion gears P4 at a radial external of the plurality of fourth pinion gears P4 to be operably connected to the fourth sun gear S4.

Here, the term "operably connected" or the like means at least two members are directly or indirectly connected to each other. However, two members that are operably connected to each other do not always rotate with the same rotation speed and in the same rotation direction thereof.

Here, the first rotation element N1 is fixedly connected to the sixth rotation element N6 and the eighth rotation element N8, the second rotation element N2 is fixedly connected to the fifth rotation element N5 and the eleventh rotation element N11, and the ninth rotation element N9 is fixedly connected to the tenth rotation element N10 such that the first, second, third, and fourth planetary gear sets PG1, PG2, PG3, and PG4 include seven shafts TM1 to TM7.

Here, the term "fixedly connected" or the like means at least two members are connected to each other to always rotate without rotation speed difference. That is, at least two members that are fixedly connected to each other always rotate with the same rotation speed and in the same rotation direction thereof. Therefore, it is to be understood by a person of an ordinary skill in the art that the term "fixedly connected" or the like differs from the term "operably connected" or the like.

The seven shafts TM1 to TM7 will be described in further detail.

The first shaft TM1 is fixedly connected to the third rotation element N3 (first ring gear R1) and is selectively connectable to the input shaft IS to be operated as a selective input element.

The second shaft TM2 is fixedly connected to the fourth rotation element N4 (second sun gear S2) and is selectively connectable to the input shaft IS to be operated as a selective input element.

The third shaft TM3 is fixedly connected to the twelfth rotation element N12 (fourth ring gear R4) and is fixedly connected to the output shaft OS to be continuously operated as an output element.

The fourth shaft TM4 is fixedly connected to the first rotation element N1 (first sun gear S1), the sixth rotation element N6 (second ring gear R2), and the eighth rotation element N8 (third planet carrier PC3).

The fifth shaft TM5 is fixedly connected to the ninth rotation element N9 (third ring gear R3) and the tenth rotation element N10 (fourth sun gear S4).

The sixth shaft TM6 is fixedly connected to the second rotation element N2 (first planet carrier PC1), the fifth rotation element N5 (second planet carrier PC2), and the eleventh rotation element N11 (fourth planet carrier PC4).

The seventh shaft TM7 is fixedly connected to the seventh rotation element N7 (third sun gear S3).

The seven shafts TM1 to TM7 fixedly connects a plurality of rotation elements among the rotation elements of the planetary gear sets PG1, PG2, PG3, and PG4 with each other, are rotation members that are connected to any one rotation element and rotate with the any one rotation element to transmit torque, are rotation members that selectively connects any one rotation element with the transmission housing H, or are fixing members that fixedly connect any one rotation element to the transmission housing H.

Here, the term "selectively connectable" or the like means that a plurality of shafts including the input shaft and the output shaft are connectable to each other through at least one of the engaging elements to rotate with the same rotation speed and in the same rotation direction thereof, or are connectable to the transmission housing through at least one of the engaging elements to be fixed to the transmission housing.

In other words, in a case that the engaging element selectively connects a plurality of shafts to each other, the plurality of shafts rotates with the same rotation speed and in the same rotation direction when the engaging element operates but the plurality of shafts are disconnected from each other when the engaging element is released.

Furthermore, in a case that the engaging element selectively connects any one shaft to the transmission housing, the corresponding shaft is fixedly connected to the transmission housing when the engaging element operates but the corresponding shaft is rotatable when the engaging element is released.

Therefore, it is to be understood by a person of an ordinary skill in the art that the term "selectively connectable" or the like differs from the term "operably connected" or the like.

Here, each of the first shaft TM1 and the second shaft TM2 is selectively connectable to the input shaft IS, the third shaft TM3 is selectively connectable to the fourth shaft TM4, and the fourth shaft TM4 is selectively connectable to the seventh shaft TM7.

Furthermore, each of the sixth shaft TM6 and the seventh shaft TM7 is selectively connectable to the transmission housing H to be operated as a selective fixed element.

Any one of the four clutches C1, C2, C3, and C4 is disposed at a portion at which any two shafts among the seven shafts TM1 to TM7 including the input shaft IS and the output shaft OS are selectively connectable to each other.

Furthermore, any one of the two brakes B1 and B2 is disposed at a portion at which any one shaft among the seven shafts TM1 to TM7 is selectively connectable to the transmission housing H.

Arrangement of the six engaging elements (four clutches C1 to C4 and two brakes B1 and B2) will be described in detail.

The first clutch C1 is disposed between the input shaft IS and the first shaft TM1 and selectively connects the input shaft IS to the first shaft TM1.

The second clutch C2 is disposed between the input shaft IS and the second shaft TM2 and selectively connects the input shaft IS to the second shaft TM2.

The third clutch C3 is disposed between the third shaft TM3 and the fourth shaft TM4 and selectively connects the third shaft TM3 to the fourth shaft TM4.

The fourth clutch C4 is disposed between the fourth shaft TM4 and the seventh shaft TM7 and selectively connects the fourth shaft TM4 to the seventh shaft TM7.

The first brake B1 is disposed between the sixth shaft TM6 and the transmission housing H and selectively connects and fixes the sixth shaft TM6 to the transmission housing H.

The second brake B2 is disposed between the seventh shaft TM7 and the transmission housing H and selectively connects and fixes the seventh shaft TM7 to the transmission housing H.

The engaging elements including the first, second, third, and fourth clutches C1, C2, C3, and C4 and the first and second brakes B1 and B2 may be multi-plates friction elements of wet type that are operated by hydraulic pressure. Multi-plates friction elements of wet type are mainly used as the engaging elements, but dog clutches, electric clutches, or magnetic clutches which may be operated by electric signal from an electric control unit may be used as the engaging elements.

Figure 2:
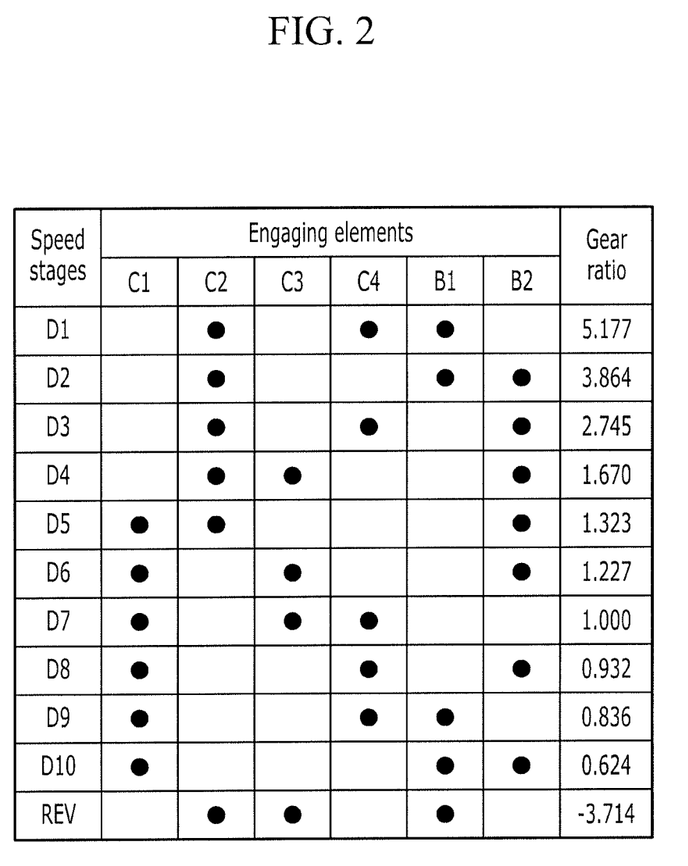
FIG. 2 is an operation chart of engagement elements at each speed stage in the planetary gear train according to the various exemplary embodiments of the present invention.

FIG. 2 is an operation chart of engaging elements at each speed stage in the planetary gear train according to the various exemplary embodiments of the present invention.

Referring to FIG. 2, any three combinations among the first, second, third, and fourth clutches C1, C2, C3, and C4 and the first and second brakes B1 and B2 are operated to achieve ten forward speeds and one reverse speed. Shifting processes will be described.

The second and fourth clutches C2 and C4 and the first brake B1 are operated at a first forward speed D1.

In a state that the input shaft IS is connected to the second shaft TM2 by operation of the second clutch C2 and the fourth shaft TM4 is connected to the seventh shaft TM7 by operation of the fourth clutch C4, torque of the input shaft IS is input to the second shaft TM2.

At the present state, the sixth shaft TM6 is operated as the fixed element by operation of the first brake B1. Therefore, the torque of the input shaft IS is shifted into the first forward speed, and the first forward speed is output through the output shaft OS fixedly connected to the third shaft TM3.

The second clutch C2 and the first and second brakes B1 and B2 are operated at a second forward speed D2.

In a state that the input shaft IS is connected to the second shaft TM2 by operation of the second clutch C2, the torque of the input shaft IS is input to the second shaft TM2.

At the present state, the sixth and seventh shafts TM6 and TM7 are operated as the fixed elements by operation of the first and second brakes B1 and B2. Therefore, the torque of the input shaft IS is shifted into the second forward speed, and the second forward speed is output through the output shaft OS fixedly connected to the third shaft TM3.

The second and fourth clutches C2 and C4 and the second brake B2 are operated at a third forward speed D3.

In a state that the input shaft IS is connected to the second shaft TM2 by operation of the second clutch C2 and the fourth shaft TM4 is connected to the seventh shaft TM7 by operation of the fourth clutch C4, the torque of the input shaft IS is input to the second shaft TM2.

At the present state, the seventh shaft TM7 is operated as the fixed element by operation of the second brake B2. Therefore, the torque of the input shaft IS is shifted into the third forward speed, and the third forward speed is output through the output shaft OS fixedly connected to the third shaft TM3.

The second and third clutches C2 and C3 and the second brake B2 are operated at a fourth forward speed D4.

In a state that the input shaft IS is connected to the second shaft TM2 by operation of the second clutch C2 and the third shaft TM3 is connected to the fourth shaft TM4 by operation of the third clutch C3, the torque of the input shaft IS is input to the second shaft TM2.

At the present state, the seventh shaft TM7 is operated as the fixed element by operation of the second brake B2. Therefore, the torque of the input shaft IS is shifted into the fourth forward speed, and the fourth forward speed is output through the output shaft OS fixedly connected to the third shaft TM3.

The first clutch and second clutch C1 and C2 and the second brake B2 are operated at a fifth forward speed D5.

In a state that the input shaft IS is connected to the first shaft TM1 by operation of the first clutch C1 and the input shaft IS is connected to the second shaft TM2 by operation of the second clutch C2, the torque of the input shaft IS is input to the first shaft TM1 and the second shaft TM2.

At the present state, the seventh shaft TM7 is operated as the fixed element by operation of the second brake B2. Therefore, the torque of the input shaft IS is shifted into the fifth forward speed, and the fifth forward speed is output through the output shaft OS fixedly connected to the third shaft TM3.

The first and third clutches C1 and C3 and the second brake B2 are operated at a sixth forward speed D6.

In a state that the input shaft IS is connected to the first shaft TM1 by operation of the first clutch C1 and the third shaft TM3 is connected to the fourth shaft TM4 by operation of the third clutch C3, the torque of the input shaft IS is input into the first shaft TM1.

At the present state, the seventh shaft TM7 is operated as the fixed element by operation of the second brake B2. Therefore, the torque of the input shaft IS is shifted into the sixth forward speed, and the sixth forward speed is output through the output shaft OS fixedly connected to the third shaft TM3.

The first, third, and fourth clutches C1, C3, and C4 are operated at a seventh forward speed D7.

The input shaft IS is connected to the first shaft TM1 by operation of the first clutch C1, the third shaft TM3 is connected to the fourth shaft TM4 by operation of the third clutch C3, and the fourth shaft TM4 is connected to the seventh shaft TM7 by operation of the fourth clutch C4.

In the instant case, the first, second, third, and fourth planetary gear sets PG1, PG2, PG3, and PG4 become lock-up states. Therefore, the torque of the input shaft IS input into the first shaft TM1 is output through the output shaft OS fixedly connected to the third shaft TM3 without change of rotation speed.

The first and fourth clutches C1 and C4 and the second brake B2 are operated at an eighth forward speed D8.

In a state that the input shaft IS is connected to the first shaft TM1 by operation of the first clutch C1 and the fourth shaft TM4 is connected to the seventh shaft TM7 by operation of the fourth clutch C4, the torque of the input shaft IS is input into the first shaft TM1.

At the present state, the seventh shaft TM7 is operated as the fixed element by operation of the second brake B2. Therefore, the torque of the input shaft IS is shifted into the eighth forward speed, and the eighth forward speed is output through the output shaft OS fixedly connected to the third shaft TM3.

The first and fourth clutches C1 and C4 and the first brake B1 are operated at a ninth forward speed D9.

In a state that the input shaft IS is connected to the first shaft TM1 by operation of the first clutch C1 and the fourth shaft TM4 is connected to the seventh shaft TM7 by operation of the fourth clutch C4, the torque of the input shaft IS is input into the first shaft TM1.

At the present state, the sixth shaft TM6 is operated as the fixed element by operation of the first brake B1. Therefore, the torque of the input shaft IS is shifted into the ninth forward speed, and the ninth forward speed is output through the output shaft OS fixedly connected to the third shaft TM3.

The first clutch C1 and the first and second brakes B1 and B2 are operated at a tenth forward speed D10.

In a state that the input shaft IS is connected to the first shaft TM1 by operation of the first clutch C1, the torque of the input shaft IS is input into the first shaft TM1.

At the present state, the sixth and seventh shafts TM6 and TM7 are operated as the fixed elements by operation of the first and second brakes B1 and B2. Therefore, the torque of the input shaft IS is shifted into the tenth forward speed, and the tenth forward speed is output through the output shaft OS fixedly connected to the third shaft TM3.

The second and third clutches C2 and C3 and the first brake B1 are operated at a reverse speed REV.

In a state that the input shaft IS is connected to the second shaft TM2 by operation of the second clutch C2 and the third shaft TM3 is connected to the fourth shaft TM4 by operation of the third clutch C3, the torque of the input shaft IS is input into the first shaft TM1.

At the present state, the sixth shaft TM6 is operated as the fixed element by operation of the first brake B1. Therefore, the torque of the input shaft IS is shifted into the reverse speed, and the reverse speed is output through the output shaft OS fixedly connected to the third shaft TM3.

Figure 3:
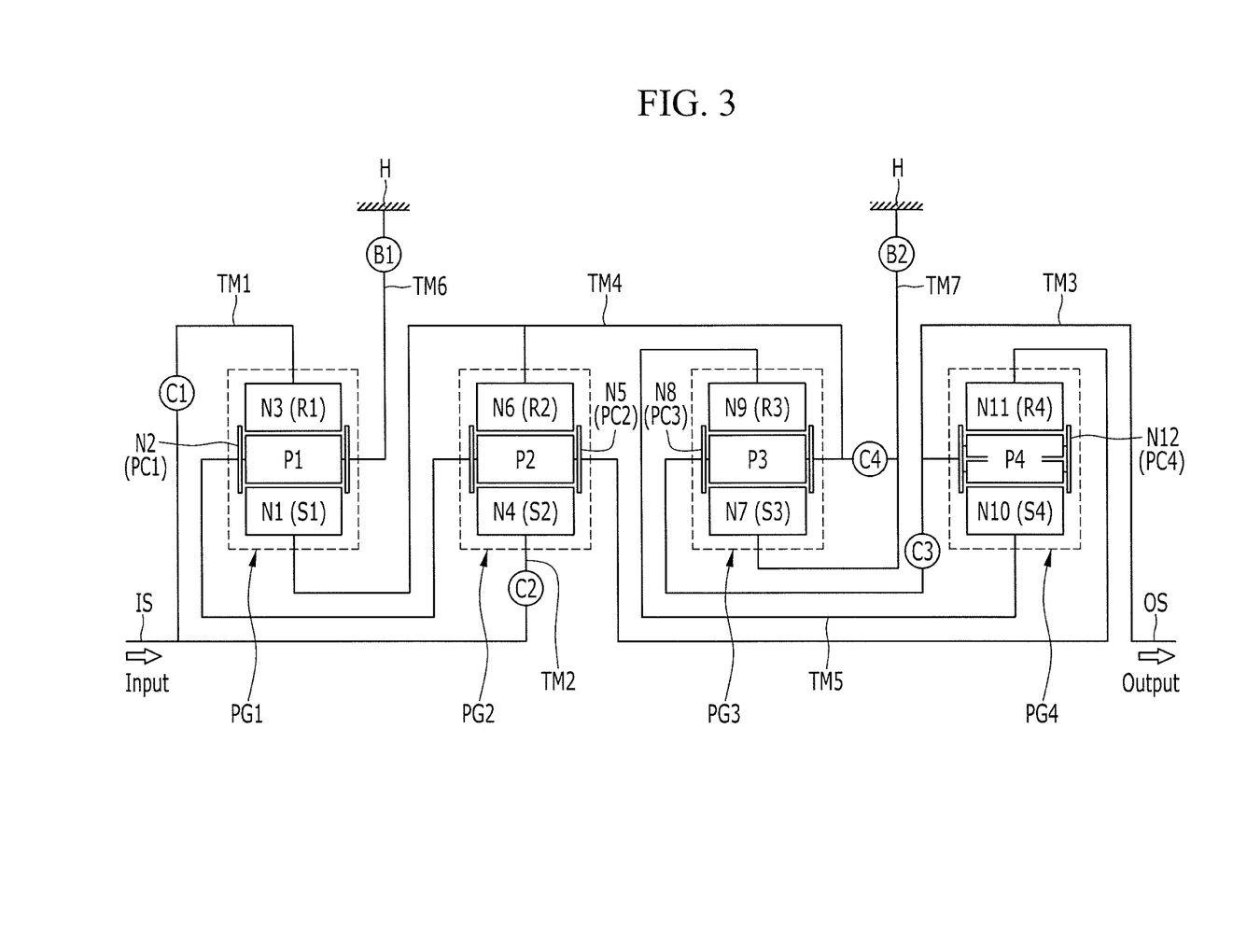
FIG. 3 is a schematic diagram of a planetary gear train according to the various exemplary embodiments of the present invention.

FIG. 3 is a schematic diagram of a planetary gear train according to various exemplary embodiments of the present invention.

Structures and operation of the planetary gear train according to the various exemplary embodiments of the present invention are similar to those of the planetary gear train according to the various exemplary embodiments of the present invention. Therefore, differences between the various exemplary embodiments and the various exemplary embodiments will be described.

Referring to FIG. 1 and FIG. 3, the fourth planetary gear set PG4 is the single pinion planetary gear set, the tenth rotation element TM10 is the fourth sun gear S4, the eleventh rotation element TM11 is the fourth planet carrier PC4, and the twelfth rotation element TM12 is the fourth ring gear R4 in the planetary gear train according to the various exemplary embodiments of the present invention, but the fourth planetary gear set PG4 is a double pinion planetary gear set, the tenth rotation element TM10 is the fourth sun gear S4, the eleventh rotation element TM11 is the fourth ring gear R4, and the twelfth rotation element TM12 is the fourth planet carrier PC4 in the planetary gear train according to the various exemplary embodiments.

According to the exemplary embodiments of the present invention, ten forward speeds and one reverse speed may be achieved by use of five planetary gear sets PG1, PG2, PG3, PG4, and PG5 and six engaging elements including the four clutches C1, C2, C3, and C4 and the two brakes B1 and B2.

Furthermore, the planetary gear train according to the various exemplary embodiments of the present invention may achieve suitable speed stages according to rotation speed of the engine. Silent driving of the vehicle may be improved by use of operation point positioned at a low rotation speed region of the engine.

Since the planetary gear train according to the exemplary embodiments of the present invention achieves multi-speed stages of the automatic transmission, driving efficiency of the engine may be maximized and power delivery performance and fuel economy may be improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the planetary gear train apparatus comprising:
    an input shaft receiving torque of an engine;
    an output shaft outputting torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    a first shaft fixedly connected to the third rotation element and selectively connectable to the input shaft;
    a second shaft fixedly connected to the fourth rotation element and selectively connectable to the input shaft;
    a third shaft fixedly connected to the twelfth rotation element and the output shaft;
    a fourth shaft fixedly connected to the first rotation element, the sixth rotation element, and the eighth rotation element;
    a fifth shaft fixedly connected to the ninth rotation element and the tenth rotation element;

a sixth shaft fixedly connected to the second rotation element, the fifth rotation element, and the eleventh rotation element; and a seventh shaft fixedly connected to the seventh rotation element.

2. The planetary gear train apparatus of claim 1, further including six engaging elements, each selectively connecting one shaft with another shaft among the first to seventh shafts or one shaft among the first to seventh shafts with a transmission housing, wherein forward speeds or reverse speeds are achieved by operating, in combinations of three engaging elements, the three engaging elements among the six engaging elements.

3. The planetary gear train apparatus of claim 2, wherein the six engaging elements comprise:

four clutches, each selectively connecting two shafts among the input shaft and the first to seventh shafts; and two brakes, each selectively connecting one shaft among the first to seventh shafts which is not connected to the output shaft with the transmission housing.

4. The planetary gear train apparatus of claim 2, wherein the six engaging elements comprise;

a first clutch mounted between the input shaft and the first shaft;

a second clutch mounted between the input shaft and the second shaft;

a third clutch mounted between the third shaft and the fourth shaft;

a fourth clutch mounted between the fourth shaft and the seventh shaft;

a first brake mounted between the sixth shaft and the transmission housing; and a second brake mounted between the seventh shaft and the transmission housing.

5. The planetary gear train apparatus of claim 1, wherein each of the first, second, third, and fourth planetary gear sets is a single pinion planetary gear set, wherein the first rotation element is a first sun gear, the second rotation element is a first planet carrier, and the third rotation element is a first ring gear, wherein the fourth rotation element is a second sun gear, the fifth rotation element is a second planet carrier, and the sixth rotation element is a second ring gear, wherein the seventh rotation element is a third sun gear, the eighth rotation element is a third planet carrier, and the ninth rotation element is a third ring gear, and wherein the tenth rotation element is a fourth sun gear, the eleventh rotation elementa fourth planet carrier, and the twelfth rotation element is a fourth ring gear.

6. The planetary gear train apparatus of claim 1, wherein each of the first, second, and third planetary gear sets is a single pinion planetary gear set, wherein the first rotation element is a first sun gear, the second rotation element is a first planet carrier, and the third rotation element is a first ring gear, wherein the fourth rotation element is a second sun gear, the fifth rotation element is a second planet carrier, and the sixth rotation element is a second ring gear, wherein the seventh rotation element is a third sun gear, the eighth rotation element is a third planet carrier, and the ninth rotation element is a third ring gear, wherein the fourth planetary gear set is a double pinion planetary gear set, and wherein the tenth rotation element is a fourth sun gear, the eleventh rotation element is a ring gear, and the twelfth rotation element is a fourth planet carrier.

7. The planetary gear train apparatus of claim 1, wherein the first, second, third, and fourth planetary gear sets are disposed in a sequence of the first, second, third, and fourth planetary gear sets from an engine side thereof.

8. A planetary gear train apparatus of an automatic transmission for a vehicle, the planetary gear train apparatus comprising:

an input shaft receiving torque of an engine;

an output shaft outputting torque;

a first planetary gear set including a first rotation element, a second rotation element, and a third rotation element;

a second planetary gear set including a fourth rotation element, a fifth rotation element, and a sixth rotation element;

a third planetary gear set including a seventh rotation element, an eighth rotation element, and a ninth rotation element;

a fourth planetary gear set including a tenth rotation element, an eleventh rotation element, and a twelfth rotation element;

a first shaft fixedly connected to the third rotation element and selectively connectable to the input shaft;

a second shaft fixedly connected to the fourth rotation element and selectively connectable to the input shaft;

a third shaft fixedly connected to the twelfth rotation element and the output shaft;

a fourth shaft fixedly connected to the first rotation element, the sixth rotation element, and the eighth rotation element;

a fifth shaft fixedly connected to the ninth rotation element and the tenth rotation element; and a plurality of shafts formed by combinations of remaining rotation elements among the first to twelfth rotation elements of the first, second, third, and fourth planetary gear sets that are not connected to the first to fifth shafts, and each thereof selectively connectable to a transmission housing.

9. The planetary gear train apparatus of claim 8, wherein the plurality of shafts includes:

a sixth shaft fixedly connected to the second rotation element, the fifth rotation element, and the eleventh rotation element; and a seventh shaft fixedly connected to the seventh rotation element.

10. The planetary gear train apparatus of claim 9, wherein the third shaft is selectively connectable to the fourth shaft and the fourth shaft is selectively connectable to the seventh shaft.

11. The planetary gear train apparatus of claim 10, further including:

a first clutch mounted between the input shaft and the first shaft;

a second clutch mounted between the input shaft and the second shaft;

a third clutch mounted between the third shaft and the fourth shaft; and a fourth clutch mounted between the fourth shaft and the seventh shaft.

12. The planetary gear train apparatus of claim 9, further including two brakes, each selectively connecting one of the sixth shaft and the seventh shaft to the transmission housing.

13. The planetary gear train apparatus of claim 12, wherein the two brakes comprise:

a first brake mounted between the sixth shaft and the transmission housing; and a second brake mounted between the seventh shaft and the transmission housing.

14. The planetary gear train apparatus of claim 8,
wherein each of the first, second, third, and fourth planetary gear sets is a single pinion planetary gear set,
wherein the first rotation element is a first sun gear, the second rotation element is a first planet carrier, and the third rotation element is a first ring gear,
wherein the fourth rotation element is a second sun gear, the fifth rotation element is a second planet carrier, and the sixth rotation element is a second ring gear,
wherein the seventh rotation element is a third sun gear, the eighth rotation elementis a third planet carrier, and the ninth rotation element is a third ring gear, and
wherein the tenth rotation element is a fourth sun gear, the eleventh rotation element is a fourth planet carrier, and the twelfth rotation element is a fourth ring gear.

15. The planetary gear train apparatus of claim 8,
wherein each of the first, second, and third planetary gear sets is a single pinion planetary gear set,
wherein the first rotation element is a first sun gear, the second rotation element is a first planet carrier, and the third rotation element is a first ring gear,
the fourth rotation element is a second sun gear, the fifth rotation element is a second planet carrier, and the sixth rotation element is a second ring gear,
the seventh rotation element is a third sun gear, the eighth rotation element is a third planet carrier, and the ninth rotation element is a third ring gear,
wherein the fourth planetary gear set is a double pinion planetary gear set, and
wherein the tenth rotation element is a fourth sun gear, the eleventh rotation element is a ring gear, and the twelfth rotation element is a fourth planet carrier.

16. A planetary gear train apparatus of an automatic transmission for a vehicle, the planetary gear train apparatus comprising:
an input shaft receiving torque of an engine;
an output shaft outputting torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element; and
a fourth planetary gear set including a tenth rotation element, an eleventh rotation element, and a twelfth rotation element,
wherein each of the third rotation element and the fourth rotation element is selectively connectable to the input shaft,
wherein the twelfth rotation element is fixedly connected to the output shaft,
wherein the first rotation element is fixedly connected to the sixth rotation element and the eighth rotation element,
wherein the second rotation element is fixedly connected to the fifth rotation element and the eleventh rotation element and is selectively connectable to a transmission housing,
wherein the seventh rotation element is selectively connectable to the transmission housing,
wherein the eighth rotation element is selectively connectable to the seventh rotation element and the twelfth rotation element, and
wherein the ninth rotation element is fixedly connected to the tenth rotation element.

17. The planetary gear train apparatus of claim 16, further including:
four clutches, each selectively connecting one rotation element among the first to twelfth rotation elements to the input shaft or selectively connecting two rotation elements among the first to twelfth rotation elements; and
two brakes, each selectively connecting one of the second rotation element and the seventh rotation element to the transmission housing.

18. The planetary gear train apparatus of claim 17,
wherein the four clutches comprise:
a first clutch mounted between the third rotation element and the input shaft;
a second clutch mounted between the fourth rotation element and the input shaft;
a third clutch mounted between the eighth rotation element and the twelfth rotation element; and
a fourth clutch mounted between the seventh rotation element and the eighth rotation element, and
wherein the two brakes comprise:
a first brake mounted between the second rotation element and the transmission housing; and
a second brake mounted between the seventh rotation element and the transmission housing.

19. The planetary gear train apparatus of claim 16,
wherein each of the first, second, third, and fourth planetary gear sets is a single pinion planetary gear set,
wherein the first rotation element is a first sun gear, the second rotation element is a first planet carrier, and the third rotation element is a first ring gear,
wherein the fourth rotation element is a second sun gear, the fifth rotation element is a second planet carrier, and the sixth rotation element is a second ring gear,
wherein the seventh rotation element is a third sun gear, the eighth rotation element is a third planet carrier, and the ninth rotation element is a third ring gear, and
wherein the tenth rotation element is a fourth sun gear, the eleventh rotation element is a fourth planet carrier, and the twelfth rotation element is a fourth ring gear.

20. The planetary gear train apparatus of claim 16,
wherein each of the first, second, and third planetary gear sets is a single pinion planetary gear set,
wherein the first rotation element is a first sun gear, the second rotation element is a first planet carrier, and the third rotation element is a first ring gear,
wherein the fourth rotation element is a second sun gear, the fifth rotation element is a second planet carrier, and the sixth rotation element is a second ring gear,
wherein the seventh rotation element is a third sun gear, the eighth rotation element is a third planet carrier, and the ninth rotation element is a third ring gear,
wherein the fourth planetary gear set is a double pinion planetary gear set, and
wherein the tenth rotation element is a fourth sun gear, the eleventh rotation element is a ring gear, and the twelfth rotation element is a fourth planet carrier.

* * * * *